US011423362B2

(12) United States Patent
Sterczyk

(10) Patent No.: US 11,423,362 B2
(45) Date of Patent: Aug. 23, 2022

(54) METHOD OF CONDUCTING WORKPLACE ELECTRONIC COMMUNICATION TRAFFIC ANALYSIS

(71) Applicant: Oliver Sterczyk, Gibsons (CA)

(72) Inventor: Oliver Sterczyk, Gibsons (CA)

( * ) Notice: Subject to any disclaimer, the term of this patent is extended or adjusted under 35 U.S.C. 154(b) by 304 days.

(21) Appl. No.: 15/795,068

(22) Filed: Oct. 26, 2017

(65) Prior Publication Data
US 2019/0130359 A1    May 2, 2019

(51) Int. Cl.
    *G06Q 10/10*    (2012.01)
    *G06Q 10/06*    (2012.01)
    *G06Q 50/00*    (2012.01)

(52) U.S. Cl.
    CPC ..... *G06Q 10/105* (2013.01); *G06Q 10/06393* (2013.01); *G06Q 50/01* (2013.01); *G06Q 10/067* (2013.01); *G06Q 10/0633* (2013.01); *G06Q 10/06316* (2013.01); *G06Q 10/103* (2013.01)

(58) Field of Classification Search
None
See application file for complete search history.

(56) References Cited

U.S. PATENT DOCUMENTS

| 5,233,513 | A  | 8/1993  | Doyle   |            |            |
|-----------|----|---------|---------|------------|------------|
| 5,745,113 | A  | 4/1998  | Goldman |            |            |
| 5,829,003 | A  | 10/1998 | Okura   |            |            |
| 6,298,349 | B1 | 10/2001 | Nimura  |            |            |
| 6,446,119 | B1 | 9/2002  | Olah    |            |            |
| 7,143,155 | B1 | 11/2006 | Lee     |            |            |
| 7,167,910 | B2 | 1/2007  | Turski  |            |            |
| 7,213,664 | B2 | 5/2007  | Smith   |            |            |
| 7,552,203 | B2 | 6/2009  | Giles   |            |            |
| 7,765,273 | B2 | 7/2010  | Kenna, III |         |            |
| 8,429,275 | B2 | 4/2013  | Macwan  |            |            |
| 8,805,996 | B1 | 8/2014  | Gauvin  |            |            |
| 8,832,210 | B2 | 9/2014  | Muszynski |          |            |
| 8,856,250 | B2 | 10/2014 | Gaffney |            |            |
| 8,903,927 | B2 | 12/2014 | Grewal  |            |            |
| 2002/0116466 | A1* | 8/2002 | Trevithick | ............... | H04L 29/06 709/206 |
| 2002/0178161 | A1* | 11/2002 | Brezin | ................ | G06F 16/9535 |
| 2003/0182310 | A1* | 9/2003 | Charnock | .............. | G06Q 10/10 |

(Continued)

OTHER PUBLICATIONS

Perer, "Visual Social Network Analytics for Relationship Discovery in the Enterprise," 2011 IEEE Conference on Visual Analytics Science and Technology (Year: 2011).*

(Continued)

*Primary Examiner* — Ivan R Goldberg
(74) *Attorney, Agent, or Firm* — Larson & Anderson, LLC

(57) ABSTRACT

Provided is a computer-implemented method of quantitatively assessing employee integration or harassment in a workplace by using employee information including name and reporting structure to create an organization chart, calculating an expected value for electronic communications between each unidirectional pair of the unique identifiers, acquiring, counting and storing the quantity of actual direct electronic communications between each unidirectional pair of unique identifiers to create a list of communication values, comparing the actual values with the expected values, and outputting a score on match or deviation of actual values compared to expected values to a data file.

15 Claims, 8 Drawing Sheets

(56) References Cited

U.S. PATENT DOCUMENTS

| | | | |
|---|---|---|---|
| 2004/0111431 A1 | 6/2004 | Schirmer | |
| 2005/0096922 A1* | 5/2005 | Huberman | G06Q 10/107 |
| | | | 705/7.11 |
| 2008/0040135 A1* | 2/2008 | VanLangen | G06Q 10/06 |
| | | | 705/342 |
| 2008/0222170 A1 | 9/2008 | Farnham | |
| 2010/0175128 A1 | 7/2010 | Doddy | |
| 2012/0059767 A1* | 3/2012 | Uthmann | G06Q 50/01 |
| | | | 705/319 |
| 2012/0151047 A1* | 6/2012 | Hodges | G06Q 50/01 |
| | | | 709/224 |
| 2012/0290565 A1* | 11/2012 | Wana | G06F 16/958 |
| | | | 707/723 |
| 2013/0179442 A1* | 7/2013 | McGuire | G06F 16/9535 |
| | | | 707/733 |
| 2014/0280553 A1* | 9/2014 | Hernandez | H04W 4/023 |
| | | | 709/204 |
| 2014/0372909 A1* | 12/2014 | Buford | G06Q 50/01 |
| | | | 715/753 |
| 2015/0381668 A1* | 12/2015 | Kurabayashi | G06Q 10/10 |
| | | | 709/204 |

OTHER PUBLICATIONS

Yuan, "Attributed Based Access Control (ABAC) for Web Services," 2005, Proc. Of the IEEE International Conference on Web Services, pp. 1-9 (Year: 2005).*
Maivizhi, "A Survey of Tools for Community Detection and Mining in Social Networks," 2016, Proceedings of the International Conference on Informatics and Analytics, pp. 1-8 (Year: 2016).*
Molina, Jose Luis. Connections 24(1): 78-91, 2001.
Callimahos, Lambros D. Introduction to Traffic Analysis. Military Cryptonalyticis, Part II, NSA. declassified Jan. 7, 2008.
Smilkov, Daniel; Jagdish, Deepack; Hidalgo, Cesar. Immersion Product website at https://immersion.media.mit.edu/demo accessed Oct. 1, 2017.

* cited by examiner

| TRAFFIC | — □ × |

MY SQL CONNECTION

SERVER [LOCALHOST]    PORT [3306]

DATABASE [TRAFFIC]

USER ID [USER]    PASSWORD [••••••••••••]

HISTORICAL ORGANIZATION CHART

START DATE [10/17/2017]    END DATE [10/17/2017]

FREQUENCY [1]    ○ DAYS    ☑ INCLUDE CONTACTS
○ MONTHS

OUTPUT FOLDER [D:\TRAFFIC]    [BROWSE...]

[GENERATE]

FIG. 7

METHOD OF CONDUCTING WORKPLACE ELECTRONIC COMMUNICATION TRAFFIC ANALYSIS

BACKGROUND

(a) Field

The subject matter disclosed generally relates to methods to assess mental wellness in the workplace.

(b) Related Prior Art

Within the field of counseling psychology, working with groups is fundamental. As explained by Bowen, M. (1978) in his book *Family Therapy in Clinical Practice*, Bowenian theory emerged from the family therapy movement in the second half of the 20$^{th}$ century to provide a theory and therapy for working with groups. Working with groups within workplaces and organizations is a natural extension. For example, Kerr, M. (1995) in his paper "The Extension of Bowen Theory to Nonfamily Groups" presented at the Conference on Organizations in Washington, D.C. observes how organizations or institutions in human society can be thought of as extensions of families. As families may be helped by counselling, so may individuals and groups interacting within the context of workplaces and organizations. Psychologists and counsellors can offer skills, resources and education to help individuals, groups and organizations recover from and prevent unhealthy and unsafe workplace practices that may hinder the function of an organization. Spector, P. E. (2000) in his book *Industrial and Organizational Psychology: Research and Practice* describes the field of industrial/organizational psychology as the science of people at work, as well as the application of the methods and principles of psychology to the workplace.

Organization chart software and social data mining are established concepts. United States published patent application US2008040135 discloses a process for preparing management organization charts using a database management program. U.S. Pat. No. 7,366,759 by Trevithick, et al. discloses a method and system for characterizing relationships in social networks.

U.S. Pat. No. 8,904,547 by Doddy, et al. discloses a system of notification upon offensive behavioral patterns in collaboration, by analyzing body content of e-mail communications.

Callimahos, L. D. (1958) article "Introduction to Traffic Analysis" published in the *NSA Technical Journal* provides a background on traffic analysis in general, particularly intercepted radio transmissions in a military context, where the meaning of the messages is not known.

Molina, J. L. (2001) article "The Informal Organizational Chart in Organizations: An Approach from the Social Network Analysis" published in Connections, 24 (1) on pages 78 to 91 aims to elucidate social networks within organizations using direct observation, sampling, informants and questionnaires, but not electronic communications metadata analysis. Visualizations in this article are much more representative of the types of diagrams typically generated in social network analysis, such diagrams being called "sociograms" according to Moreno, J. L., & Jennings, H. H. (1934) in their book *Who Shall Survive? A New Approach to the Problem of Human Interrelations*. FIG. 1 in the article visualizes an organization at a high level. FIGS. 2, 3, 4, 7 and 9 visualize social networks within the organization. However, the data are much more difficult to interpret than FIG. 6 in the current patent application because the sociograms in Molina do not resemble an organization chart. Molina was not able to combine the data into a single visualization.

Smilkov, D., Jagdish, D., & Hidalgo, C. Massachusetts Institute of Technology (2013). Immersion: A People-centric View of Your Email Life. Retrieved Jan. 6, 2016 from https://immersion.media.mit.edu/

In general, prior work focuses on analyzing the body contents of messages or communications. The shortcoming to these techniques is that they invade privacy and drive some employees to stop using electronic communications altogether or use personal computers and electronic communications accounts outside of the scrutiny of the organization.

Thus, there remains a need for an automated and scalable way to assess workplace communications traffic in a non-invasive way to assess employee integration, mental health, and address unhealthy communication practices for the purpose of increasing workplace health and happiness, as well as organizational effectiveness.

SUMMARY

According to an embodiment of this invention, there is provided a computer-implemented method of assessing employee integration in a workplace, the method including: receiving employee information including name and reporting structure, assigning a unique identifier to each employee in said workplace, creating a virtual workplace representation based on reporting structure, populating said workplace organizational chart with said unique identifiers, calculating an expected value for electronic communications between each unidirectional pair of the unique identifiers, based on a stored database resident in a computer memory, and storing said expected values, acquiring, counting and storing the quantity of actual direct electronic communications between each unidirectional pair of unique identifiers to create a list of unique communication values, comparing the resulting actual values with the expected values of communication for each unidirectional pair, and outputting a score on identity and deviation of actual values compared to expected values to a data file.

According to another embodiment, the actual values are divided or multiplied by an integer selected to enhance a visual representation of the actual values.

According to another embodiment, the expected values are divided or multiplied by an integer selected to enhance a visual representation of the expected values. According to yet another embodiment, the data file is converted to a graphical representation of actual values as compared to expected values superimposed on an image of the workplace representation.

According to another embodiment, the measuring of unique unidirectional electronic communication is performed by social network software. According to yet another embodiment, the score is a quantitative measure of integration of each employee in a workplace. According to another embodiment, the method further includes filtering the electronic communication to exclude some pairs.

According to another embodiment, the method further includes importing electronic communication metadata into a relational database. According to another embodiment, the virtual workplace representation is converted to a graphical image. According to yet another embodiment, the employee information is imported from a data file, and in another embodiment, the employee information is entered manually by a user via a data entry screen. In a further embodiment of the invention, the method further includes creating a tree data structure representation of an organization chart.

According to another embodiment, the method further includes analyzing, transforming and exporting relational data to a memory. In yet another embodiment of the invention, the method includes doing social network analysis via header-information of said electronic communication.

According to another embodiment of the invention, the method further includes outputting data to a user. In yet another embodiment, the task of calculating is performed by assigning a unique identifier to each employee in said workplace, for example C1, C2, C3, C4, etc., populating said virtual workplace with these unique identifiers C1, C2, C3, C4, etc., and measuring and storing the quantity of direct electronic communications for each unidirectional pair of unique identifiers, C1:C2=a, C2:C1=b, C1:C3=d, C2:C3=e, C3:C2=f, C3:C1=g, C2:C4=h, C3:C4=i, C1:C4=j, . . . etc., with a,b,d,e,f,g,h,i,j . . . etc. being the values that are then compared with an expected value for that virtual workplace, based on which employees should be communicating more according to the organization chart, and finally outputting a report on deviations of measured compared to expected values to a data file or, in some embodiments, to a graphical user interface as a pictorial or visual representation.

According to another embodiment, the method of the invention is used to automate or facilitate assessing the degree of employee integration and overall workplace health. In one embodiment, the method is used to assess workplace bullying or harassment.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 7 is a screen shot of the user interface of the traffic analysis application according to an embodiment.

It will be noted that throughout the appended drawings, like features are identified by like reference numerals.

DETAILED DESCRIPTION

In this disclosure, the word "including" is used in a non-limiting sense to mean that items following the word are included, but items not specifically mentioned are not excluded. It will be understood that in embodiments which comprise or may comprise a specified feature or variable or parameter, alternative embodiments may consist, or consist essentially of such features, or variables or parameters. A reference to an element by the indefinite article "a" does not exclude the possibility that more than one of the elements is present, unless the context clearly requires that there be one and only one of the elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5 etc.). A series of 1 to n is represented by "1, 2, 3, 4, 5 . . . ". "n" would be the number of employees or study participants. In this disclosure the singular forms of "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

Figure 2:
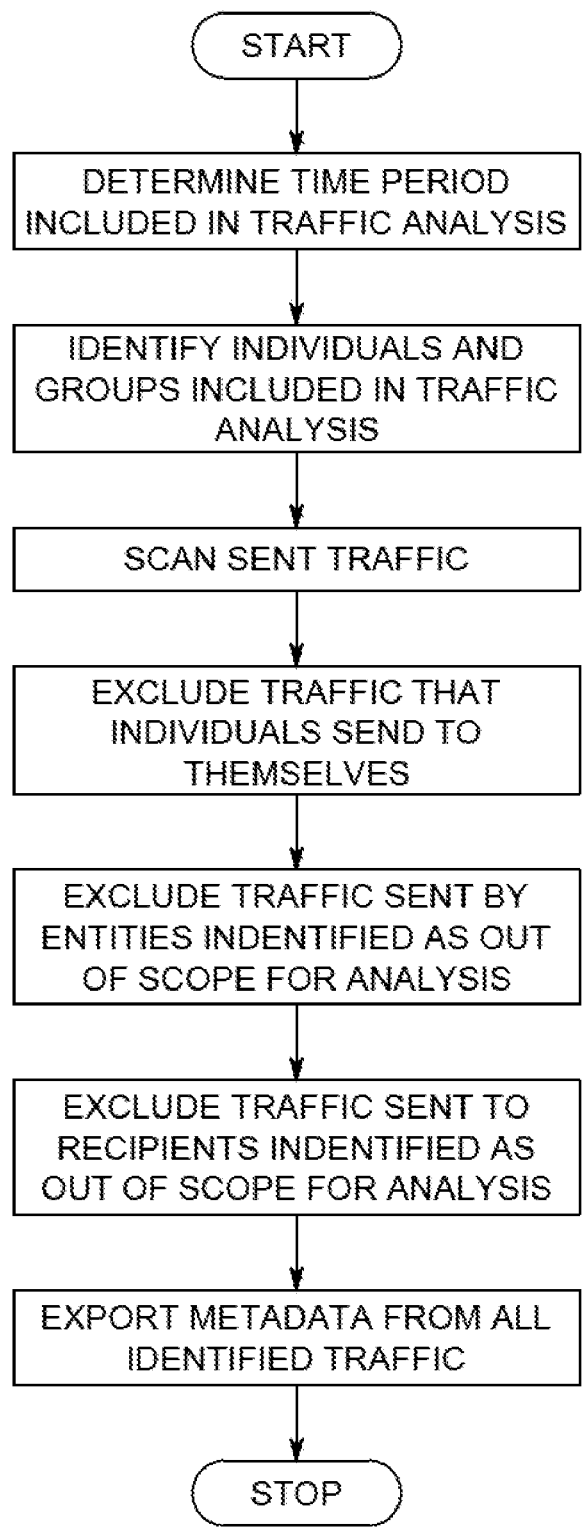
FIG. 2 illustrates filtering traffic for visualization and social network analysis as a flow chart.

A communications traffic server supports exporting traffic using a standard format into a relational database for filtering. Alternately, depending on the availability of automation on the traffic server, filtering is implemented prior to or during the traffic export process. FIG. 2 further defines the filtering process.

Metadata is information that accompanies or is embedded with the body of a message. Metadata may also be referred to as header information. Metadata includes mandatory routing information for a message including the sender, recipient(s), date and subject. Metadata can also include optional information such as CC and BCC, as well as sending time stamps and receiving time stamps added by all computer or software programs that transfer a message from one computer to another.

Reports, or reporting structure is intended to mean to whom an employee receives instructions from, who assesses his performance ("his" means either male and female), and who supervises him. There may be one or more reports for a particular employee. This data is key to positioning an employee on a virtual workplace representation.

The relational database involved in conducting workplace traffic analysis is MySQL freeware in some embodiments, which is an open source relational database. The selection of an appropriate relational database management system (RDBMS) for conducting workplace traffic analysis depends on multiple factors including the size of the data set to be analyzed.

The social network "analyses" involves addition, subtraction, multiplication and division, calculated based on observable characteristics of social networks (scale ratios being calculated using factorial division).

The word "harassment" means a situation wherein one employee, whether it be a supervisor, peer, or report, is communicating at an unhealthy level to another. The quantitative aspect of the method is helpful for backing up an employee claim of harassment, or assessing the verity of the claim. Another term for harassment is "bullying".

In an embodiment, a company organization chart is represented relationally along with traffic data to facilitate data transformations required to create visualizations and conduct social network analyses that are fundamental to workplace traffic analysis.

To accomplish the visual representation of this data, an organization of existing data must be performed by the method of the invention. One view is a time-stamped organization chart representing the structure of the organization—where the physical arrangement of points is determined using the shortest possible lines in order to represent affiliations between organizational units that may be people, teams, departments or divisions in terms of spatial distance.

Another view according to an embodiment of the invention is time-stamped sociograms representing the flow of traffic between individuals as directed ties and the volume of traffic as the strength or intensity of ties, based on data found in headers specifying the sender, recipient(s), date and subject of traffic, where arrowheads on ties or lines indicate the direction of traffic from a sender to a recipient, and where a value from one to nine is assigned to a line to indicate the strength or intensity of the relationship.

Data are organized in the software by group name, individual name, traffic address and job title. Changes in the "sociogram" with the passage of time are determined by pairing corresponding points in different versions of sociograms to identify and analyze differences. Drawing the flow of traffic between individuals on an organization chart simplifies data visualization.

Analyzing, transforming and exporting relational data for visualization and social network analysis meshes with relational databases containing traffic metadata and organization chart representations. The process outputs text files containing scripts and data that serve as input for visualization and social network analysis software tools.

Figure 6A:
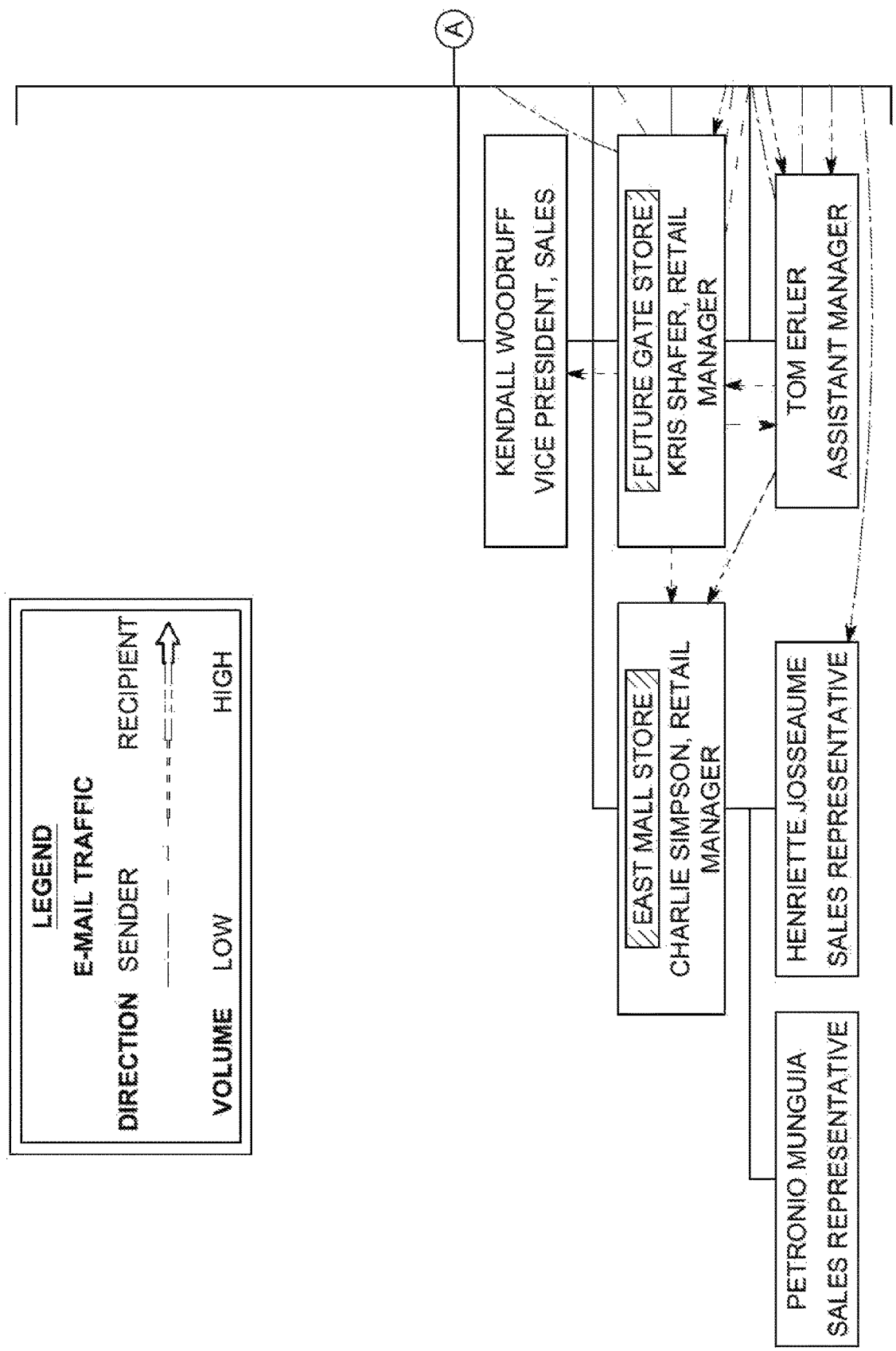
FIGS. 6A and 6B are two parts of one image illustrating how the visualization of the product of the method of the invention appears to the user, with the different patterns of arrows representing greater or lesser quantities.
Figure 6B:
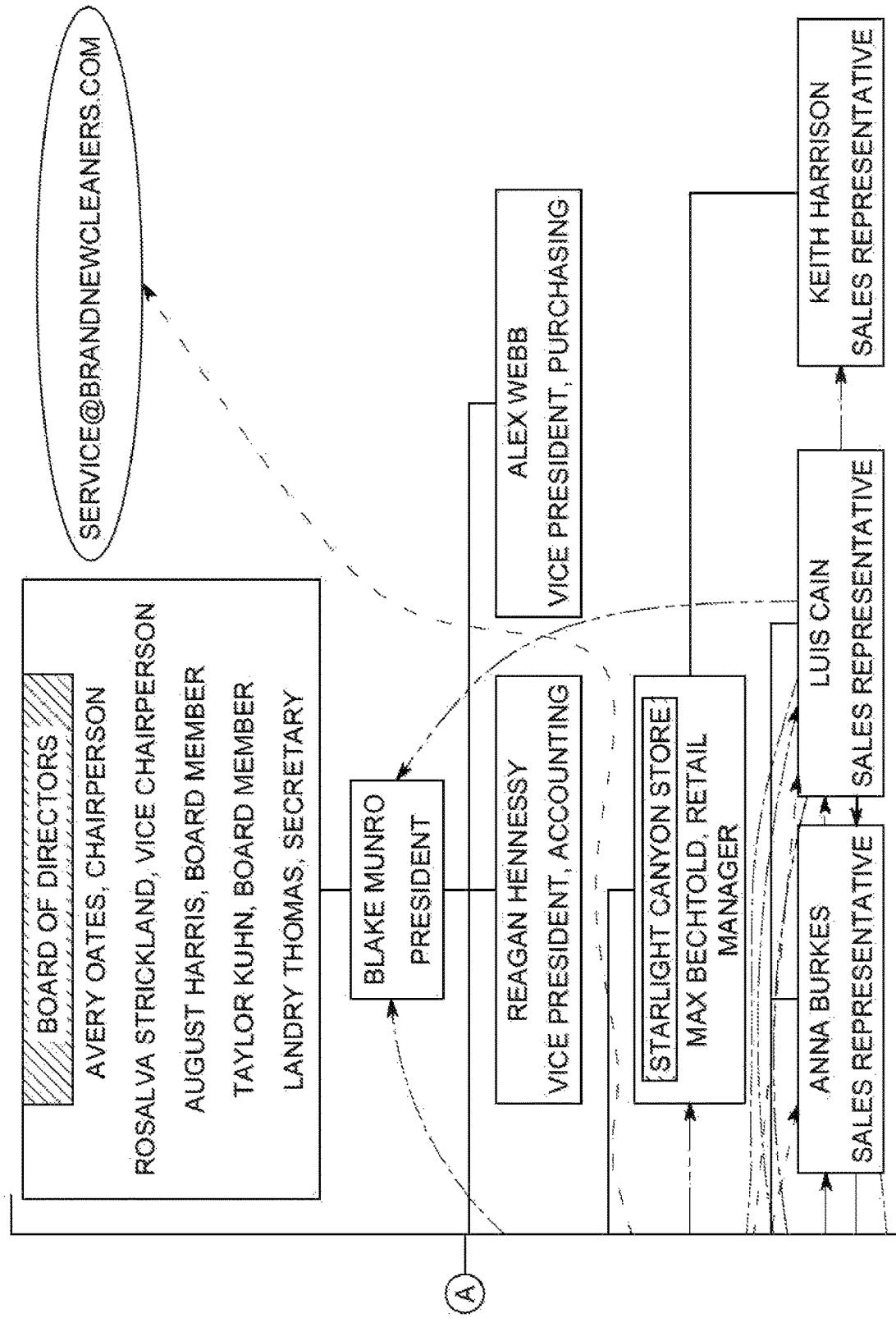

For preparing visualizations, embodiments include the third-party open source Graphviz™ Graph Visualization Software (http://www.graphviz.org) combined with a modified version of a third-party gvpr script named org.g. In FIG. 6, we see an example of traffic flow represented on an organization chart as an example of visualization. The format of FIG. 6 integrates organization chart data with traffic data in a novel, useful representation designed to make workplace traffic analysis more intuitive and accessible for users. Without the embodiment of the invention, the user would have to employ separate figures, tables and matrices to review and try to interpret the traffic flow data.

Embodiments of the invention incorporate NetMiner™ Social Network Analysis Software (http://www.netminer.com) for conducting the social network analysis. Graphviz is used to illustrate the organization chart with data visualizations.

Univariate and bivariate statistics conventionally apply to data consisting of arrays where rows represent entities—such as individuals—and columns represent attributes, variables or measures. Cells contain scores that entities receive or achieve on the attributes, variables or measures. Univariate statistics involve one variable at a time. Univariate statistics include calculations such as mean, median and mode. Bivariate statistics involve two variables that are paired, for example in determining positive, negative or zero correlation between variables. Univariate and bivariate statistics are commonly employed in quantitative research.

However, social network analysis differs from quantitative and qualitative types of research. Central in social network analysis are arrays of measurements where columns of the array represent the same set of entities as rows. Each cell in the array describes a relationship between entities. Analyses tend to focus on entities and interactions, rather than entities and attributes, facilitating comparisons between entities as well as holistic observations of patterns of individual choices within networks.

In-depth analyses in response to the following questions related to the structure of a social network helped to refine the examination of results generated by the method of the invention. The following are weightings in the data analysis and computer software.

Density—How many nodes are connected? In a group structured into a long chain of connections in which information is communicated through a series of intermediaries, meanings are more likely to become distorted and altered with each step in the flow of communication. As explained by Scott, J. (2012) in his book What Is Social Network Analysis, in a group where there are many direct connections and alternative channels of communication, meanings are less likely to alter because multiple channels introduce corrections, resulting in the expectation of greater conformity in thought and behaviour.

Distance and Closeness—By following lines in a sociogram, how many nodes must be traversed in order to connect two points? As explained by Scott, J. (2012) also in his book What Is Social Network Analysis, information may become more and more misinterpreted or distorted as the number of nodes that must be traversed increases.

Spatial Distance—How closely does the social network of individuals and groups involved in the study resemble the organization chart? How strong are ties? As discussed by Granovetter, M. S. (1974) in his book *Getting a Job: A Study of Contacts and Careers*, individuals who cultivate generally looser connections beyond their immediate locality in the organization chart may tend to find more opportunities.

Betweenness—To what extent is a node able to act as an intermediary in a large number of network flows? Roethlisberger, F. J., Dickson, W. J., Wright, H. A., & Western Electric Company. (1939) in the book *Management and the Worker: An Account of a Research Program Conducted by the Western Electric Company, Hawthorne Works, Chicago* found that individuals who interact frequently may depict cliques, and that isolated individuals may find it difficult to get help when needed.

Figure 3:
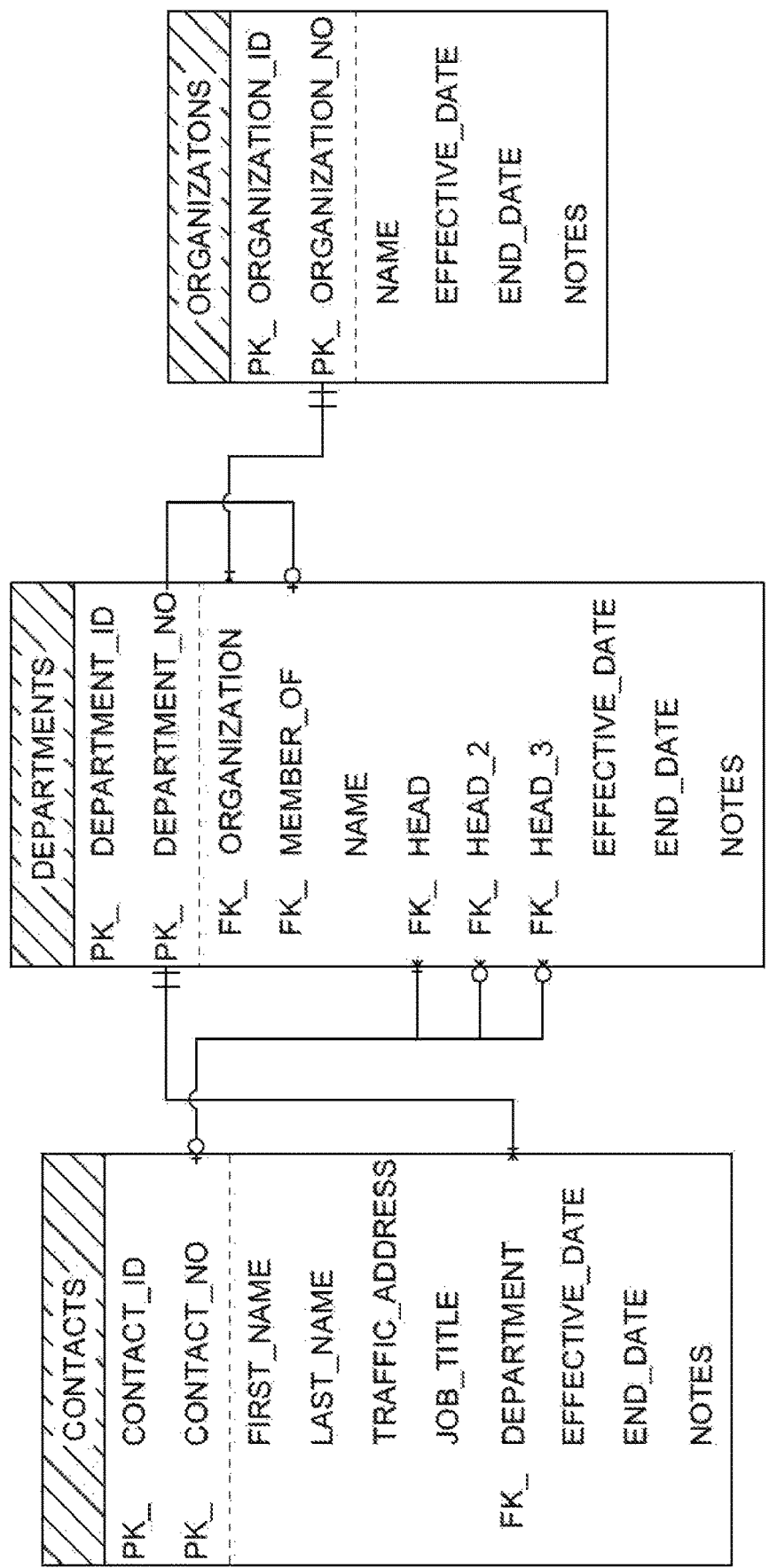
FIG. 3 is a representation of Organization Charts Over Time Entity Relationship Diagram (ERD)

Referring now to FIG. 3, representing organization charts over time involves the following relational database tables:

contacts—The contacts table contains at least one record for each individual included in an analysis of workplace traffic who is sending and receiving traffic. When details for an individual change, then a new record for the individual containing updated details is created. All records pertaining to the same individual use the same unique value in the contact_no field as an identifier.

departments—The departments table contains at least one record for each department or group within an organization involved in an analysis of workplace traffic. When details of a department change, then a new record for the department containing updated details is created. All records pertaining to the same department use the same unique value in the department_no field as an identifier.

organizations—The organizations table contains at least one record for each organization involved in an analysis of workplace traffic. When details of an organization change, then a new record for the organization containing updated details is created. All records pertaining to the same organization use the same unique value in the organization_no field as an identifier.

Further details regarding fields in the contacts, departments and organizations tables are discussed below.

Fields labeled PK_ indicate fields including a unique primary key for records in the respective table. Fields labeled FK_ are foreign key fields that link to records in another table via key values.

The following fields appear in the contacts table:

contact_id—The contact_id field is a primary key for the contacts table. Each record in the contacts table contains a unique value in the contact_id field.

contact_no—Each individual represented in the contacts table is assigned a unique contact number. When the history of an individual within an organization is represented by multiple records within the contacts table, then each record representing the individual contains the same unique value in the contact_no field.

first_name—The first_name field contains the given name of the individual represented by the record.

last_name—The last_name field contains the surname of the individual represented by the record.

traffic_address—The traffic_address field contains the unique identifier for the traffic account that the individual represented by the record uses. For example, the traffic_address field may contain the e-mail address assigned to an individual within an organization.

job_title—The job_title field contains the role or position of the individual represented by the record.

department—Using the department number, the department field contains a link to the department where the individual represented by the record works.

effective_date—The effective_date field contains the date on which the details provided in the record about an individual begin to apply.

end_date—If the record for an individual is historical, then the end_date field contains the date on which the details provided in the record no longer apply.

notes—Optionally, the notes field contains any additional information relevant to the individual that the record represents.

The following fields appear in the departments table:

department_id—The department_id field is a primary key for the departments table. Each record in the departments table contains a unique value in the department_id field.

department_no—Each department represented in the departments table is assigned a unique department number. When the history of a department within an organization is represented by multiple records within the departments table, then each record representing the department contains the same unique value in the department_no field.

organization—Using the organization number, the organization field contains a link to the organization within which the department represented by the record resides.

member of—Using the department number, the member of field optionally contains a link to the parent department of the department represented by the record.

name—The name field contains the name of the department represented by the record.

head, head_2 and head_3—Using the contact number, the head, head_2 and head_3 fields each contain a links to a different individual in charge of the department represented by the record. The head field is required, whereas the head_2 and head_3 fields are optional.

effective_date—The effective_date field contains the date on which the details provided in the record about a department begin to apply.

end_date—If the record for a department is historical, then the end_date field contains the date on which the details provided in the record no longer apply.

notes—Optionally, the notes field contains any additional information relevant to the department or state of the department that the record represents.

The following fields appear in the organizations table:

organization_id—The organization_id field is a primary key for the organizations table. Each record in the organizations table contains a unique value in the organization_id field.

organization_no—Each organization represented in the organizations table is assigned a unique organization number. When the history of an organization is represented by multiple records within the organizations table, then each record representing the organization contains the same unique value in the organization_no field.

name—The name field contains the name of the organization.

effective_date—The effective_date field contains the date on which the details provided in the record about an organization begin to apply.

end_date—If the record for an organization is historical, then the end_date field contains the date on which the details provided in the record no longer apply.

notes—Optionally, the notes field contains any additional information relevant to the organization or state of the organization that the record represents.

The present invention will be more readily understood by referring to the following examples which are given to illustrate the invention rather than to limit its scope.

Example 1

Data Collection

For each traffic account involved in the research, export sender, recipient(s), date and subject details for every traffic message sent during a 12-month period subjected to the following:

Filter exported header data to exclude:

traffic that individuals send to themselves, traffic recipients identified as out of the scope of the proposed research, including individuals who are no longer employees of the organization, and personal messages.

Remaining traffic header data are parsed to generate a one-mode matrix indicating the number of messages sent between each traffic account involved in the study and all other traffic accounts involved in the study, including messages sent to multiple recipients. The one-mode matrix created is then scaled, so that the number of messages sent between any two accounts is represented by a value from one to nine where:

One represents the fewest number of messages sent, relative to the maximum number of messages sent between pairs of individuals involved in the study;

Nine represents the highest number of messages sent, relative to the maximum number of messages sent between pairs of individuals involved in the study; and two through eight represent equally sized ranges between the values one and nine.

A time-stamped tree structure is generated, representing the organization chart indicating:

the hierarchy of group(s) involved in the study, first name, last name, traffic account, job title and group membership of each individual involved in the study, and the head(s) of each group.

The organization chart tree structure is then parsed to prepare:

a table where values indicate first name, last name, traffic account, job title and department or group membership of each individual involved in the study, a table where values indicate the department or group to which each department or group in the organization directly reports, a two-mode matrix where values indicate department or group membership of individuals as well as individual heads of departments or groups, and a one-mode matrix where values indicate that the individual represented by the row reports to the individual represented by the column.

If the organization chart changes during the research period, then multiple time-stamped tables and matrices are required.

The data structures representing traffic and the organization chart prepared are saved in file formats suitable for import into Graphviz™ and NetMiner™ for visualization and analysis.

The traffic analysis application launches Graphviz indicating saved files as input files, as well as additional parameters as needed to generate visualizations. The traffic analysis application also launches a NetMiner script to conduct social network analyses, indicating saved files as input files.

Figure 1:
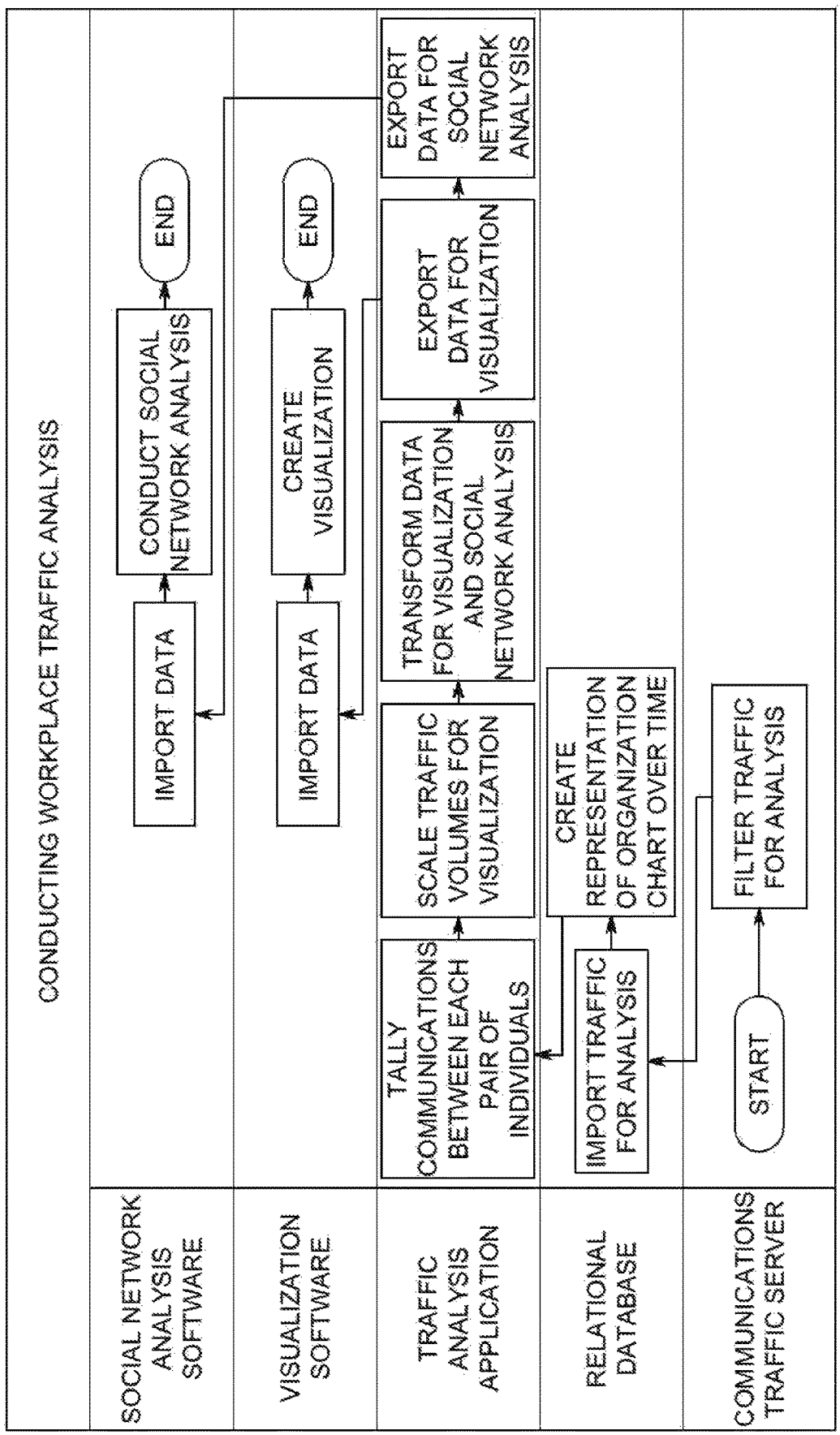
FIG. 1 illustrates the process of conducting workplace traffic analysis via a swim lane diagram.

Referring to FIG. 1, communications server traffic, such as from an e-mail server for example, is filtered to exclude personal or other non-target traffic, in the bottom "swim lane". FIG. 2 provides a more detailed description of the filters placed on the traffic to exclude personal messages and messages to self. In the second lane from the bottom, the actions of the relational database are shown, namely importing and creating an organizational chart rendition over time. In the third lane up, the traffic analysis application tallies, scales and transforms data. The traffic analysis application subsequently exports data for visualization and social network analysis as two separate workflows. The traffic analysis application overlays data from the traffic analysis onto a representation of the organizational chart in DOT language for visualization by the visualization software to provide a visual indication of the quantity and direction of communication between each pair of employees. Generated DOT language is exported in a text file. The traffic analysis application exports data for social network analysis in files such as text files using *.csv comma-separated value (CSV) formatting (five files) for import into Social Network Analysis Software (NetMiner™). Specifically, the text files represent data to provide the example visualization and social network analysis. The data in the text files represent the same data used in the creation of FIG. 6.

When the "sociogram" or visualization as shown in FIG. 6 is reviewed, the following characteristics are danger signs indicating a toxic environment or negative interpersonal interactions: few nodes are connected; information is communicated by passing through a high number of intermediaries; the structure of social networks lacks resemblance to the organization chart; individuals do not have any connection beyond their immediate locality in the organization chart; and/or, one or more individuals is isolated.

NetMiner™ software is the social network analysis software we have adapted to acquire data values to compare to the expected calculated quanta based on the organization chart. The values that we can obtain include measures of the global density of a network as a ratio of the number of lines present to the maximum possible number of lines. The possibilities of using density to compare different types of networks are limited because density inherently is expected to vary with the size of a network—for example, the ability of individuals to sustain relationships is limited. Global density can be a useful comparative measure if reported alongside measures of network size and inclusiveness. NetMiner measures inclusiveness as a ratio of the number of nodes in a network connected to at least one other node, to the total number of nodes.

Ego density refers to the extent to which the immediate connections of a node mutually interact with each other and is calculated as a ratio of the number of lines present to the maximum number of lines possible.

In NetMiner™ software, the matrix produced showing the minimum number of nodes that must be traversed between each node in a network is a symmetrical concept. Ties are considered undirected. Fields in the matrix having the value zero (0) indicate that nodes are unreachable.

An aggregate measure of distance, namely "closeness", in NetMiner™ is calculated as the inverse of the sum of the shortest distances from one node to all other nodes multiplied by n−1, where n is the total number of nodes in the network structure. A higher value for a node indicates that fewer nodes likely must be traversed in order to reach a randomly chosen node by following lines in the organization chart.

In embodiments of the invention, analyzing spatial distance involves comparing the number of nodes that separate individuals interacting via communications traffic when following lines in the organization chart.

Betweenness centrality is a measure of how often a given node falls along the shortest path between two other nodes, as explained by Borgatti, S. P., Everett, M., & Johnson, J. C. (2013) in the book *Analyzing Social Networks*. The more frequently a node appears on the shortest distances between all other pairs of nodes, the higher the betweenness. As explained in the *NetMiner Module Reference*, in NetMiner when measuring shortest distances to calculate betweenness the weight of links is ignored.

As explained in the *Getting Started with NetMiner* documentation, visualization provides an overview of the global pattern of network data and serves as a starting point for further analysis. In embodiments of the invention, drawing the flow of traffic between individuals as well as relationships is based on data compiled from the organization chart acquired from the workplace. We combined the capabilities of existing organization chart software org.g, and Graphviz visualization software to arrive at the graphical image shown in this embodiment.

Referring to FIG. 7, here is the data entry page for the application according to embodiments of the invention. The user provides credentials for connecting to the relational database containing traffic metadata as well as the representation of the organization chart over time. The user also sets the time frame of traffic metadata to include in visualization and social network analyses, as well as the time period to use for aggregating data within the selected time period. Clearing the Include Contacts checkbox conducts visualization and social network analyses at the department or group level, without identifying individuals within departments or groups. The user also sets the output folder in which to save exported data, visualization and social network analysis files.

Referring to FIG. 6, an organization chart for a fictitious chain of retail stores was prepared. Specifically, the "Export Data for Visualization.gv" script referred to in FIG. 1 generates FIG. 6. In the script, multi-line comments are contained between /* and */ while single-line comments begin with //. Width and color (color not shown) of lines indicate volume, and arrowheads point from sender to recipient. The workplace traffic analysis includes messages that individuals involved in the study may send to recipients outside the group(s) involved in the study, including recipients outside the organization such as clients, customers or independent contractors. In the visualization, message recipients who are outside the group(s) or organization involved in the study appear by default as isolated nodes in the organization chart. The visualization does not include messages that employees working in the fictitious store received from employees at other stores or from outside the organization.

The weighted lines were created using Graphviz™. The Legend is created separately using Microsoft Visio™.

Now referring again to FIG. 1, there is shown an embodiment of the invention as a swim lane diagram. "Export data for Visualization.gv" is an example script that the traffic analysis application generates automatically. The Visualization Software (Graphviz™) parses the script to create the visualization of the traffic analysis. The five text CSV-formatted files are examples that the traffic analysis application generates automatically. NetMiner™ software parses the CSV files in performing social network analysis.

Now referring to FIG. 2, there is shown an embodiment of the filtering traffic processes as a flow chart. The time period to be included is determined by the user inputting a date or time range on a keyboard. Individuals and groups included in the traffic analysis are identified. Sent communications traffic is scanned. Messages that are sent by the individual to themselves are excluded. Messages to and from outsiders or other out-of-scope individuals are omitted. Finally, the metadata for all selected traffic are exported. The process stops.

Now referring to FIG. 3, there is shown an embodiment of a relational database design as an entity relationship diagram (ERD).

Figure 4:
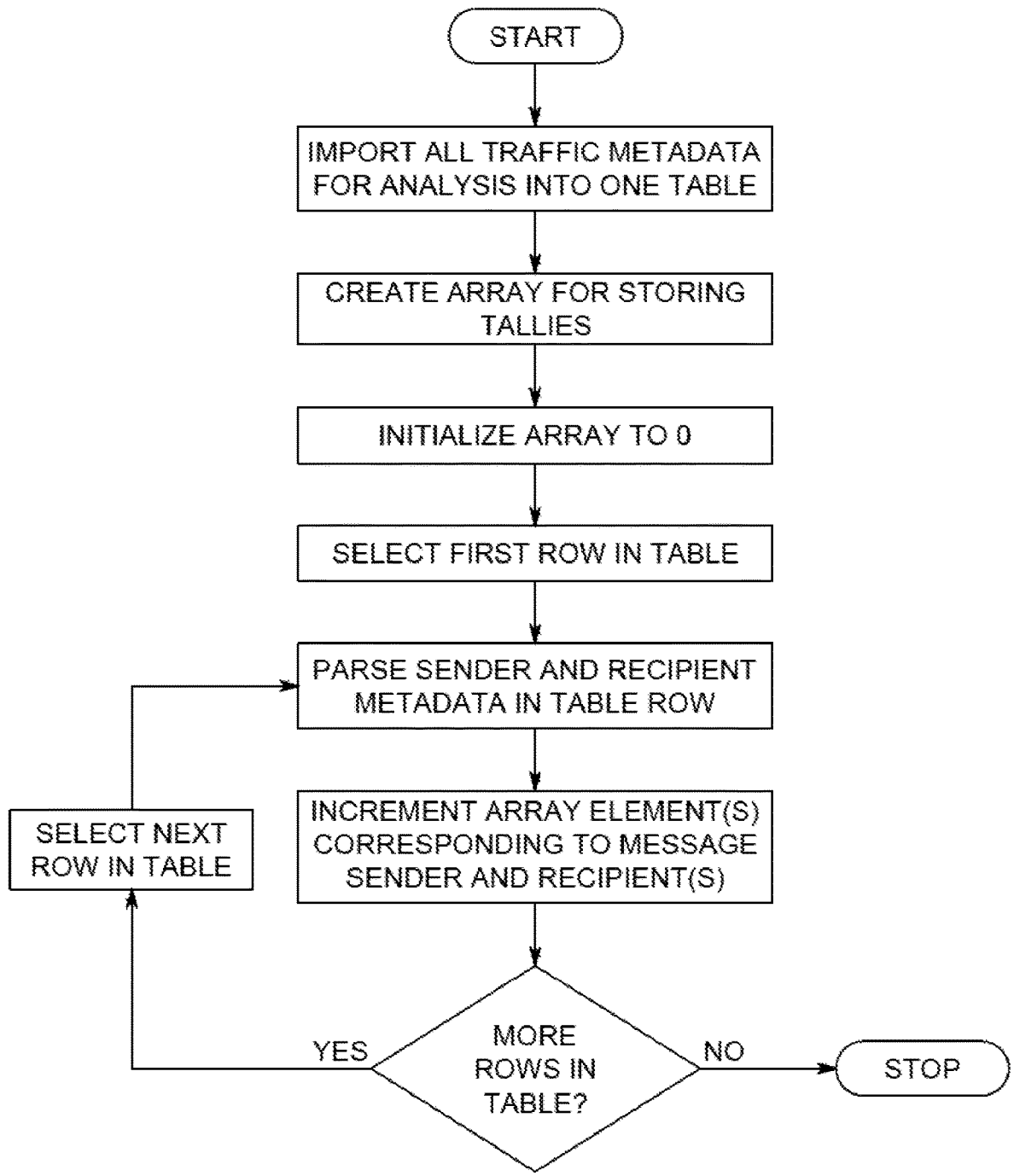
FIG. 4 illustrates the processes involved in tallying communication between pairs of individuals.

In FIG. 4, the flow cart describes the processes involved in tallying communication between each pair of individuals. In the data, each row in a relational database table storing traffic metadata represents one message. For each individual included in workplace traffic analysis, one row and one column exists in the array created for storing tallies. The array is initialized to zero, and the first table row is selected. Sender and recipient metadata are parsed from the row and elements in the array created for storing tallies are incremented accordingly. The process repeats until all rows in the table are parsed. Finally process stops at end of data.

Figure 5:
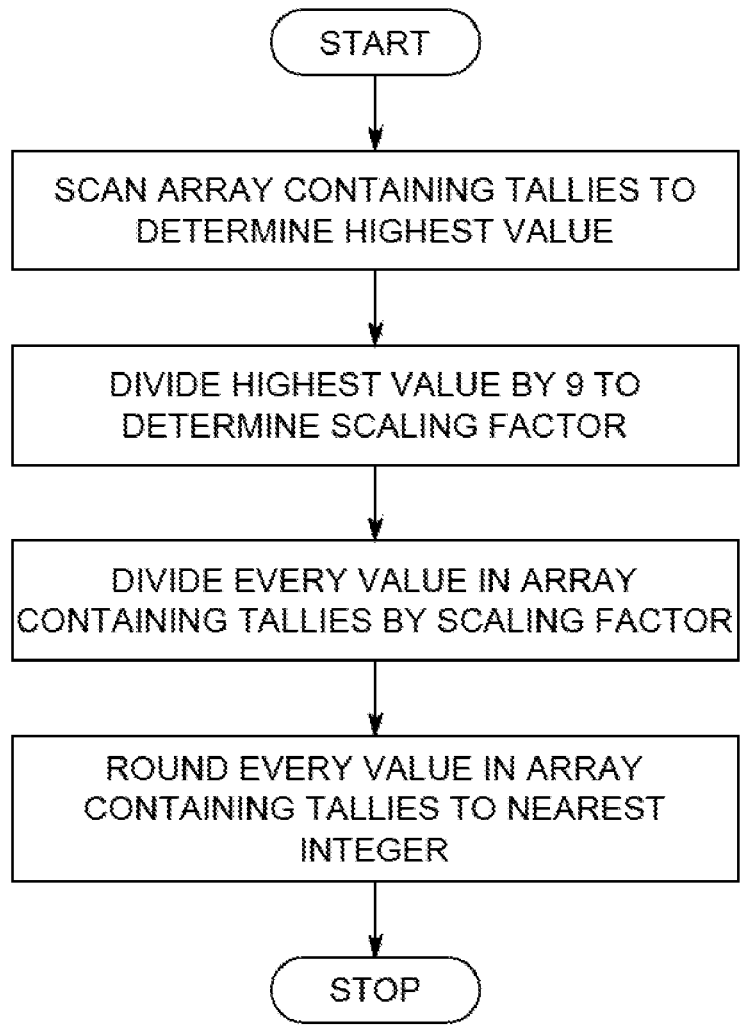
FIG. 5 illustrates the process of scaling traffic volumes for visualization.

Referring to FIG. 5, the process of scaling traffic volumes for visualization. As in a graph whose units are too few or many to be clearly visualized, traffic volume data needs to be scaled for viewing in some embodiments. For this, the array is scanned for highest value. The highest value is divided by 9 to determine a scaling factor. Then, every value in the array is divided by this scaling factor. The values are then rounded to the nearest integer. The process stops when the scaling process is complete, and the scaled data are then exported to the visualization process.

Example 2

Exemplification of Code for Workplace Traffic Analysis Software Export Data Visualization

```
/*
Example script to draw Traffic Flow on Organization Chart
*/
digraph traffic_org_chart {
    graph [outputorder="nodesfirst", overlap="scale", splines="spline", bgcolor=white, resolution=144, fontname="Calibri", fontsize="11", fontcolor="black"]
    node [fontname="Calibri", fontsize="14", fontcolor="black"]
    // Set a default value for the constraint attribute, which when true indicates to replace lines with right-angle lines
    edge [fontname="Calibri", fontsize="14", fontcolor="black", dir=none, constraint="true" ]
    //
    // NODES
    //
    BoardOfDirectors [shape="box", label=<<table border="0" cellborder="0" cellpadding="3" bgcolor="white"><tr><td bgcolor="grey" align="center"><font color="white">Board of Directors</font></td></tr><tr><td align="center" port="AveryOates">Avery Oates, Chairperson</td></tr><tr><td align="center" port="RosalvaStrickland">Rosalva Strickland, Vice Chairperson</td></tr><tr><td align="center" port="AugustHarris">August Harris, Board Member</td></tr><tr><td align="center" port="TaylorKuhn">Taylor Kuhn, Board Member</td></tr><tr><td align="center" port="LandryThomas">Landry Thomas, Secretary</td></tr></table>> ]
    BlakeMunro [shape="box", label=<<table border="0" cellborder="0" cellpadding="3" bgcolor="white"><tr><td bgcolor="white" align="center"><font color="black">Blake Munro</font></td></tr><tr><td align="center">President</td></tr></table>> ]
    KendallWoodruff [shape="box", label=<<table border="0" cellborder="0" cellpadding="3" bgcolor="white"><tr><td bgcolor="white" align="center"><font color="black">Kendall Woodruff</font></td></tr><tr><td align="center">Vice President, Sales</td></tr></table>> ]
    ReaganHennessy [shape="box", label=<<table border="0" cellborder="0" cellpadding="3" bgcolor="white"><tr><td bgcolor="white" align="center"><font color="black">Reagan Hennessy</font></td></tr><tr><td align="center">Vice President, Accounting</td></tr></table>> ]
    AlexWebb [shape="box", label=<<table border="0" cellborder="0" cellpadding="3" bgcolor="white"><tr><td bgcolor="white" align="center"><font color="black">Alex Webb</font></td></tr><tr><td align="center">Vice President, Purchasing</td></tr></table>> ]
    EastMallStore [shape="box", label=<<table border="0"
```

-continued

```
cellborder="0" cellpadding="3" bgcolor="white"><tr><td bgcolor="grey"
align="center"><font color="white">East Mall Store</font></td></tr><tr><td
align="center" port="CharlieSimpson">Charlie Simpson, Retail
Manager</td></tr></table>> ]
            FutureGateStore [shape="box", label=<<table border="0"
cellborder="0" cellpadding="3" bgcolor="white"><tr><td bgcolor="grey"
align="center"><font color="white">Future Gate Store</font></td></tr><tr><td
align="center" port="KrisShafer">Kris Shafer, Retail Manager</td></tr></table>>
]
            StarlightCanyonStore [shape="box", label=<<table
border="0" cellborder="0" cellpadding="3" bgcolor="white"><tr><td
bgcolor="grey" align="center"><font color="white">Starlight Canyon
Store</font></td></tr><tr><td align="center" port="MaxBechtold">Max Bechtold,
Retail Manager</td></tr></table>> ]
            TomErler [shape="box", label=<<table border="0"
cellborder="0" cellpadding="3" bgcolor="white"><tr><td bgcolor="white"
align="center"><font color="black">Tom Erler</font></td></tr><tr><td
align="center">Assistant Manager</td></tr></table>> ]
            AnnaBurkes [shape="box", label=<<table border="0"
cellborder="0" cellpadding="3" bgcolor="white"><tr><td bgcolor="white"
align="center"><font color="black">Anna Burkes</font></td></tr><tr><td
align="center">Sales Representative</td></tr></table>> ]
            LuisCain [shape="box", label=<<table border="0"
cellborder="0" cellpadding="3" bgcolor="white"><tr><td bgcolor="white"
align="center"><font color="black"> Luis Cain</font></td></tr><tr><td
align="center">Sales Representative</td></tr></table>> ]
            PetronioMunguia [shape="box", label=<<table border="0"
cellborder="0" cellpadding="3" bgcolor="white"><tr><td bgcolor="white"
align="center"><font color="black">Petronio Munguia</font></td></tr><tr><td
align="center">Sales Representative</td></tr></table>> ]
            HenrietteJosseaume [shape="box", label=<<table border="0"
cellborder="0" cellpadding="3" bgcolor="white"><tr><td bgcolor="white"
align="center"><font color="black">Henriette Josseaume</font></td></tr><tr><td
align="center">Sales Representative</td></tr></table>> ]
            KeithHarrison [shape="box", label=<<table border="0"
cellborder="0" cellpadding="3" bgcolor="white"><tr><td bgcolor="white"
align="center"><font color="black">Keith Harrison</font></td></tr><tr><td
align="center">Sales Representative</td></tr></table>> ]
            //
            // EDGES (ORGANIZATION CHART)
            //
            BoardOfDirectors->BlakeMunro
            BlakeMunro->KendallWoodruff
            BlakeMunro->ReaganHennessy
            BlakeMunro->AlexWebb
            KendallWoodruff->EastMallStore
            KendallWoodruff->FutureGateStore
            KendallWoodruff->StarlightCanyonStore
            EastMallStore->PetronioMunguia
            EastMallStore->HenrietteJosseaume
            FutureGateStore->TomErler
            FutureGateStore->AnnaBurkes
            FutureGateStore->LuisCain
            StarlightCanyonStore->KeithHarrison
        // To generate the org chart only, uncomment the following line, as
well as
            // the corresponding closing comment below
            // /*
            //
            // EDGES (E-MAIL TRAFFIC)
            //
```

// The following lines are used for representing e-mail traffic. Low traffic volume is a thin green line, high traffic is a thick red line, and other volumes are colors and line widths in between, as defined in the following table:

```
//
//Line Value | color | penwidth
//   1    #4AB848    1
//   2    #C0D72F    1
//   3    #F3EC18    2
//   4    #FFC809    2
//   5    #FBAB18    3
//   6    #F8901F    3
```

-continued

```
//   7    #F57722    4
//   8    #F26223    4
//   9    #EA3522    5
//
// The fourth hexadecimal number in the RGB value for the
color attribute sets alpha:
//   80 is 50%
//   BF is 75%
//   E5 is 90%
//
```

-continued

```
        FutureGateStore:KrisShafer->TomErler
[color="#FBAB18BF", dir="forward", penwidth="3", constraint="false" ]
        FutureGateStore:KrisShafer->AnnaBurkes
[color="#FBAB18BF", dir="forward", penwidth="3", constraint="false" ]
        FutureGateStore:KrisShafer->LuisCain [color="#FBAB18BF",
dir="forward", penwidth="3", constraint="false" ]
        AnnaBurkes->FutureGateStore:KrisShafer
[color="#C0D72FBF", dir="forward", penwidth="1", constraint="false" ]
        LuisCain->FutureGateStore:KrisShafer [color="#C0D72FBF",
dir="forward", penwidth="1", constraint="false" ]
        TomErler->FutureGateStore:KrisShafer
[color="#F3EC18BF", dir="forward", penwidth="2", constraint="false" ]
        AnnaBurkes->TomErler [color="#4AB848BF", dir="forward",
penwidth="1", constraint="false" ]
        LuisCain->TomErler [color="#4AB848BF", dir="forward",
penwidth="1", constraint="false" ]
        FutureGateStore:KrisShafer->EastMallStore:CharlieSimpson
[color="#F3EC18BF", dir="forward", penwidth="2", constraint="false" ]
        FutureGateStore:KrisShafer-
>StarlightCanyonStore:MaxBechtold      [color="#4AB848BF",
dir="forward", penwidth="1", constraint="false" ]
        LuisCain->AnnaBurkes [color="#F57722BF", dir="forward",
penwidth="4", constraint="false" ]
        AnnaBurkes->LuisCain [color="#F3EC18BF", dir="forward",
penwidth="2", constraint="false" ]
        FutureGateStore:KrisShafer-
>"service@brandnewcleaners.com"        [color="#FFC809BF",
dir="forward", penwidth="2", constraint="false" ]
        AnnaBurkes->HenrietteJosseaume      [color="#C0D72FBF",
dir="forward", penwidth="1", constraint="false" ]
        LuisCain->KeithHarrison [color="#C0D72FBF", dir="forward",
penwidth="1", constraint="false" ]
        LuisCain->BlakeMunro [color="#4AB848BF", dir="forward",
penwidth="1", constraint="false" ]
        FutureGateStore:KrisShafer->BlakeMunro
[color="#C0D72FBF", dir="forward", penwidth="1", constraint="false" ]
        FutureGateStore->KendallWoodruff      [color="#F3EC18BF",
dir="forward", penwidth="2", constraint="false" ]
        TomErler->AnnaBurkes [color="#C0D72FBF", dir="forward",
penwidth="1", constraint="false" ]
        TomErler->LuisCain    [color="#C0D72FBF", dir="forward",
penwidth="1", constraint="false" ]
        TomErler->EastMallStore:CharlieSimpson
[color="#4AB848BF", dir="forward", penwidth="1", constraint="false" ]
        // To generate the org chart only, uncomment the following line, as
well as
        // the corresponding opening comment above
        // */
        }
        END
```

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method of assessing electronic communications between employees in a workplace to assess employee integration and/or harassment in the workplace, the method including the steps of:
  a) sending and receiving electronic communications having header information between employees in a workplace to create electronic communication server traffic, and storing the electronic communication server traffic in a computer memory, wherein the header information comprises metadata selected from the group consisting of: sender information, recipient information, subject information, time stamp information, and date stamp information;
  b) receiving or creating and storing in the computer memory an organizational chart of employees in the workplace, wherein the organizational chart contains employee information comprising employee names, employee reporting structure, social networks between employees, unique identifiers of each employee, and expected values for electronic communications between each unidirectional pair of the unique identifiers;
  c) using traffic analysis software to:
    (1) analyze the header information in the electronic communication server traffic stored in the computer memory including quantifying the number of direct electronic communications between each unidirectional pair of unique identifiers to create unique communication values, and to store the unique communication values in the computer memory; and
    (2) overlay the unique communication values onto the organizational chart and to store the overlayed information in the computer memory;
  (d) using visualization software to provide a graphic visualization of the overlayed information stored in the computer memory, wherein the graphic visualization of the overlayed information is representative of employee integration and/or harassment in the workplace; and
  (e) using social networking software to analyze the unique communication values, including:
    (1) comparing the unique communication values to the organizational chart to create a raw score that is representative of employee integration and/or harassment in the workplace; and
    (2) weighting the raw score created in step (e)(1) using matrices and/or arrays comprising weighting factors determined from the electronic communication header information and the organizational chart and selected from the group consisting of: density, distance and closeness, spatial distance, and betweenness
  thereby assessing electronic communications between employees in the workplace to assess employee integration and/or harassment in the workplace in a computer-implemented method.

2. The method of claim 1, wherein during step (c) the quantity of direct electronic communications are divided or multiplied by an integer selected to enhance a visual representation in step (d).

3. The method of claim 1, wherein during step (c) the expected values are divided or multiplied by an integer selected to enhance a visual representation in step (d).

4. The method of claim 1, wherein the score is a quantitative measure of integration and/or harassment of each employee in a workplace.

5. The method of claim 1, wherein the method further comprises filtering electronic communication to exclude some pairs of unique identifiers and/or some electronic communications.

6. The method of claim 1, wherein the method further comprises receiving and storing metadata characterizing the electronic communication server traffic in the computer memory.

7. The method of claim 1, wherein said employee information is received in step (b) from an employee information data file.

8. The method of claim 1, wherein said employee information is received in step (b) by manual entry by a user using a user interface.

9. The method of claim 1 further including creating a tree data structure representation of an organization chart.

10. The method of claim 1, further including the steps of analyzing, transforming and exporting relational data to the computer memory.

11. The method of claim 1, further including the step of outputting the organization chart containing employee information including additional social networks between employees, unique communication values and the score to a user wherein the user is a psychologist or counselor.

12. The method of claim 1, wherein the score is used to assess workplace health.

13. The method of claim 1, further comprising outputting unique communication values and the score to a data file and storing the data file in the computer memory.

14. The method of claim 1, wherein the assessment of electronic communications between employees in the workplace to assess employee integration and/or harassment in the workplace occurs without analyzing the body contents of the electronic communications.

15. The method of claim 1, wherein the organizational chart further comprises electronic communication server traffic flow information between employees.

* * * * *